United States Patent [19]

Canzoneri et al.

[11] Patent Number: 5,080,780
[45] Date of Patent: Jan. 14, 1992

[54] SINGLE CELL VERTICAL STATIC FLOW FLOTATION UNIT CROSS-REFERENCE TO RELATED APPLICATIONS

[75] Inventors: Anthony S. Canzoneri, Kenner; Ronald A. Boze, Covington, both of La.

[73] Assignee: Process Development Company, Covington, La.

[21] Appl. No.: 563,323

[22] Filed: Jul. 27, 1990

Related U.S. Application Data

[63] Continuation of Ser. No. 384,833, Jul. 25, 1989, Pat. No. 5,011,597, which is a continuation-in-part of Ser. No. 255,505, Oct. 11, 1988, abandoned.

[51] Int. Cl.$^5$ .................................. B01D 17/035
[52] U.S. Cl. .................................. 210/104; 210/109; 210/138; 210/194; 210/221.2; 209/170
[58] Field of Search ............... 210/138, 194, 221.2, 210/104, 109, 703, 744, 221.1; 209/170

[56] References Cited

U.S. PATENT DOCUMENTS

| | | | |
|---|---|---|---|
| 1,139,024 | 5/1915 | Frank | 209/170 |
| 1,235,083 | 7/1917 | Wagner | 209/170 |
| 1,312,754 | 8/1919 | Roward | 209/170 |
| 2,307,154 | 1/1943 | Osuna | 210/703 |
| 2,770,365 | 11/1956 | Welsch | 209/170 |
| 3,271,293 | 9/1966 | Cleuk | 209/170 |
| 3,347,784 | 10/1967 | Kappe | 210/221.1 |
| 3,432,038 | 3/1969 | Heskett | 210/136 |
| 3,433,359 | 3/1969 | Lundin | 240/221.2 |
| 3,477,581 | 11/1969 | Stearns | 210/221.2 |
| 4,094,783 | 6/1978 | Jackson | 209/170 |
| 4,331,534 | 5/1982 | Burnscheidt | 209/170 |
| 4,338,192 | 7/1982 | Krasnoff | 209/170 |
| 4,490,248 | 12/1984 | Filippo | 209/170 |
| 4,563,274 | 1/1986 | Rothon | 210/138 |
| 4,564,457 | 1/1986 | Cairo et al. | 209/170 |
| 4,572,786 | 2/1986 | Endo | 210/221.1 |
| 4,627,922 | 12/1986 | Viator | 210/221.2 |
| 4,649,281 | 3/1987 | Schmitt | 210/194 |
| 4,724,073 | 2/1988 | Calltharp | 210/221.2 |
| 4,782,789 | 11/1988 | Canzoneri | 209/170 |
| 4,834,872 | 5/1989 | Overath | 209/170 |
| 4,902,429 | 2/1990 | Carpenter | 209/170 |
| 4,986,903 | 1/1991 | Canzoneri | 209/170 |
| 5,011,597 | 4/1991 | Canzoneri | 210/138 |

FOREIGN PATENT DOCUMENTS

| | | | |
|---|---|---|---|
| 1101305 | 7/1984 | U.S.S.R. | 209/170 |
| 2079618 | 1/1982 | United Kingdom | 210/703 |
| 2162092 | 1/1986 | United Kingdom | 209/170 |

*Primary Examiner*—Stanley S. Silverman
*Assistant Examiner*—Thomas M. Lithgow
*Attorney, Agent, or Firm*—Keaty & Keaty

[57] ABSTRACT

The invention relates to a new and improved apparatus for removing suspended matter from liquid. The apparatus has a single cell vertical cylindrical hydraulic flotation vessel which is provided with a separation wall to separate a lower gasification chamber from a middle degasification chamber and an upper gas chamber. A number of alternative arrangements are provided for controlling skim collection through controlling volume of liquid within the vessel and changing the volume of liquid through the use of adjustable timer which intermittently send signals to outlet valves of the skim collection outlet or of the treated liquid outlet.

The invention provides for alternative arrangement of introducing liquid into the vessel, so as to achieve more intimate mixing of gas and liquid introduced into the vessel.

13 Claims, 6 Drawing Sheets

SINGLE CELL VERTICAL STATIC FLOW FLOTATION UNIT CROSS-REFERENCE TO RELATED APPLICATIONS

Cross-Reference to Related Applications

This is a continuation of application Ser. No. 384,833 filed July 25, 1989 now U.S. Pat. No. 5,011,597 which is a continuation-in-part of co-pending U.S. patent application Ser. No. 255,505 filed Oct. 11, 1988, (now abandoned) entitled "Induced Static Flotation Cell", the disclosure of which is incorporated by reference herein.

BACKGROUND OF THE INVENTION

The present invention relates to a method and apparatus for removing suspended matter from liquid. The method and apparatus of the present invention have utility, for example, in separating suspended contaminants and/or oil from water.

Even more specifically, the present invention relates to a method and apparatus, wherein small bubbles created by the air injection into the main body of liquid attach themselves to the particles or droplets of contaminants to be removed and provide buoyancy to raise them to the surface of the liquid. The froth created on the surface of the liquid is removed from the surface, while heavy clean liquid remains below the froth level.

In many industries, including oil, paper and pulp, textile, electricity generating and food processing, there is an ever present problem of contaminated water as a by-product of various processes. In particular, water is often used to aid in the production of oil and gas on offshore platforms. This water is usually pumped into a formation in order to pump oil out. As a result, the water becomes contaminated with oil and solids encountered in the formation, and therefore, cannot be disposed of simply by dumping it into the surrounding water. Accordingly, numerous methods and systems have been devised to reduce the contaminant content in this water to a level which allows discharge of the water into the sea.

One such apparatus is disclosed in U.S. Pat. No. 4,782,789 issued on Nov. 8, 1988 for "Induced Static Flotation Cell". The device in accordance with '789 patent uses a plurality of gasification chambers which are sequentially, horizontally arranged for gradual separation of contaminants from water through mixing it with air bubbles which carry the contaminant laden froth to the top of the chambers for removal therefrom.

However, under certain conditions, especially wherein the space is restricted, it is impossible to utilize a horizontally arranged multi-cell unit. Additionally, a careful balancing of gas flow and liquid flow is required in order for the unit to successfully separate contaminants from water.

Another system of flotation separator is disclosed in U.S. Pat. No. 4,094,783 issued on June 13, 1978 for "Centrifugal Flotation Separator". The system, in accordance with '783 patent, shows the use of a circular, cylindrical vessel with a horizontal tray positioned inside the vessel near the top, with the tray having an axial opening. Air under pressure is introduced into the vessel from the top of the vessel, while contaminated fluid is introduced through a tangential pipe, under pressure, at a level below the tray.

However, there is a disadvantage of introducing air from the top of the vessel, since some portions of the contaminated liquid may escape mixing with air and merely settle on the bottom of the vessel, thus considerably reducing the quality of skim separation.

The present invention contemplates elimination of the above drawbacks associated with the known devices.

SUMMARY OF THE INVENTION

The present invention achieves its objects and overcomes shortcomings of the prior art in a simple and straightforward manner. A substantially cylindrical, vertically oriented vessel is provided, said vessel having a closure at the bottom and the top. An interior chamber formed within the vessel is divided by an annular separation wall. The separation wall divides a lower gasification chamber from a middle degasification chamber and an upper gas chamber. The separation wall has a concave shape with a central opening, from which a funnel or conduit extends upwardly through the degasification chamber and terminates a distance below a conduit serving as a skim collection outlet. The liquid to be treated is introduced into the vessel through one or more liquid distribution lines. A primary distribution line provides for the use of at least one distribution header having an outlet adjacent a bottom of the vessel for introducing the liquid having suspended matter therein into the vessel. In the alternative, in addition to the primary, a secondary liquid distribution system can be used which allows for intimate mixing of the liquid with a gas flow which is introduced into the vessel by an eductor means having an outlet inside the interior chamber slightly above the outlet of the primary liquid distribution system. When a second alternative method is used, the flow of liquid into the vessel is controlled by a pressure controller through a three-way pressure control valve which diverts any excess liquid to the primary liquid distribution outlet, bypassing the secondary liquid distribution line. A liquid recirculation line which connects the bottom of the degasification chamber with the liquid inlet line is provided with a normally closed check valve which is mounted upstream from a point of connection of recirculation line and the inlet line. The check valve opens when pressure in the recirculation line less than the pressure in the main liquid inlet line is detected.

A gas recirculation line fluidly connects a gas chamber in the uppermost portion of the vessel with a gas eductor means which introduces gas at the bottom of the vessel to achieve better mixing of the liquid delivered into the vessel with the gas. Mounted within the gas eductor line, substantially coaxially therewith, is an outlet of the secondary liquid distribution line.

A number of alternative arrangements to control skim collection are provided in accordance with the present invention. In accordance with the first arrangement, a liquid level controller positioned in the upper portion of the vessel transmits a signal to a control valve which is mounted at the outlet for removing the treated liquid from the vessel. An adjustable timer interrupts a signal from the liquid level controller, so as to close the valve and cause the volume of liquid within the vessel to increase, thus raising the level of liquid and allowing the froth which has been carried to an uppermost portion of the vessel by gas bubbles to spill over the edge of the skim collection funnel and be removed from the vessel through a skim collection outlet. In accordance with a second alternative arrangement, the means for controlling skim collection volume are provided with a normally open treated liquid outlet valve, an adjustable timer which is connected to that valve and a vertically adjustable nozzle which is set to allow a predetermined volume of liquid to exit the vessel. Depending on the amount of suspended contaminants in the liquid introduced into the vessel, the timer is set to intermittently close the valve at the outlet for the treated liquid, allowing the volume in the vessel to increase, the level of liquid to rise, causing the froth to spill over the edge of the skim collection funnel and to exit from the vessel. In accordance with a still further arrangement, the means for controlling skim collection volume comprise a liquid level controller which is connected to an upper portion of the vessel, a treated liquid outlet control valve which is operatively connected to receive a signal from the liquid level controller, an adjustable timer and a skim collection outlet valve which opens in response to an intermittent signal received from the timer. Since the skim outlet valve is normally closed, the froth is allowed to collect in the upper portion of the vessel above the skim collection funnel. When the timer opens the skim collection outlet valve, the froth is allowed to exit through the skim outlet means.

Still, further means for controlling skim collection volume comprise a normally closed skim collection outlet valve, an adjustable timer operatively connected to the skim collection outlet valve and adapted to send intermittent signals to the valve, causing the valve to open and allow outlet of the froth which has collected above the skim collection funnel from the vessel. A vertically adjustable nozzle which is connected to the treated liquid outlet is preset to maintain a predetermined volume of liquid in the vessel by allowing a predetermined flow of liquid to exit the vessel.

It is, therefore, an object of the present invention to provide an improved apparatus for removing suspended matter from a liquid.

It is a further object of the present invention to provide a single cell vertical flotation apparatus for removing suspended matter from a liquid.

It is still a further object of the present invention to provide an apparatus having alternative ways of controlling skim collection volume from the vessel.

It is still a further object of the present invention to provide an alternative method for intimate mixing of the liquid having suspended matter therein with gas injected into the vessel.

It is still a further object of the present invention to provide an apparatus having better gas distribution and improved efficiency of skim collecting.

These and other objects of the invention will be more apparent from the following detailed description of the invention.

BRIEF DESCRIPTION OF THE DRAWINGS

For further understanding of the nature, objects and advantages of the present invention, reference will be had to the following detailed description, taken in conjunction with the accompanying drawings, in which like parts are given like reference numerals, and wherein.

DETAILED DESCRIPTION OF THE PREFERRED EMBODIMENT

Figure 1:
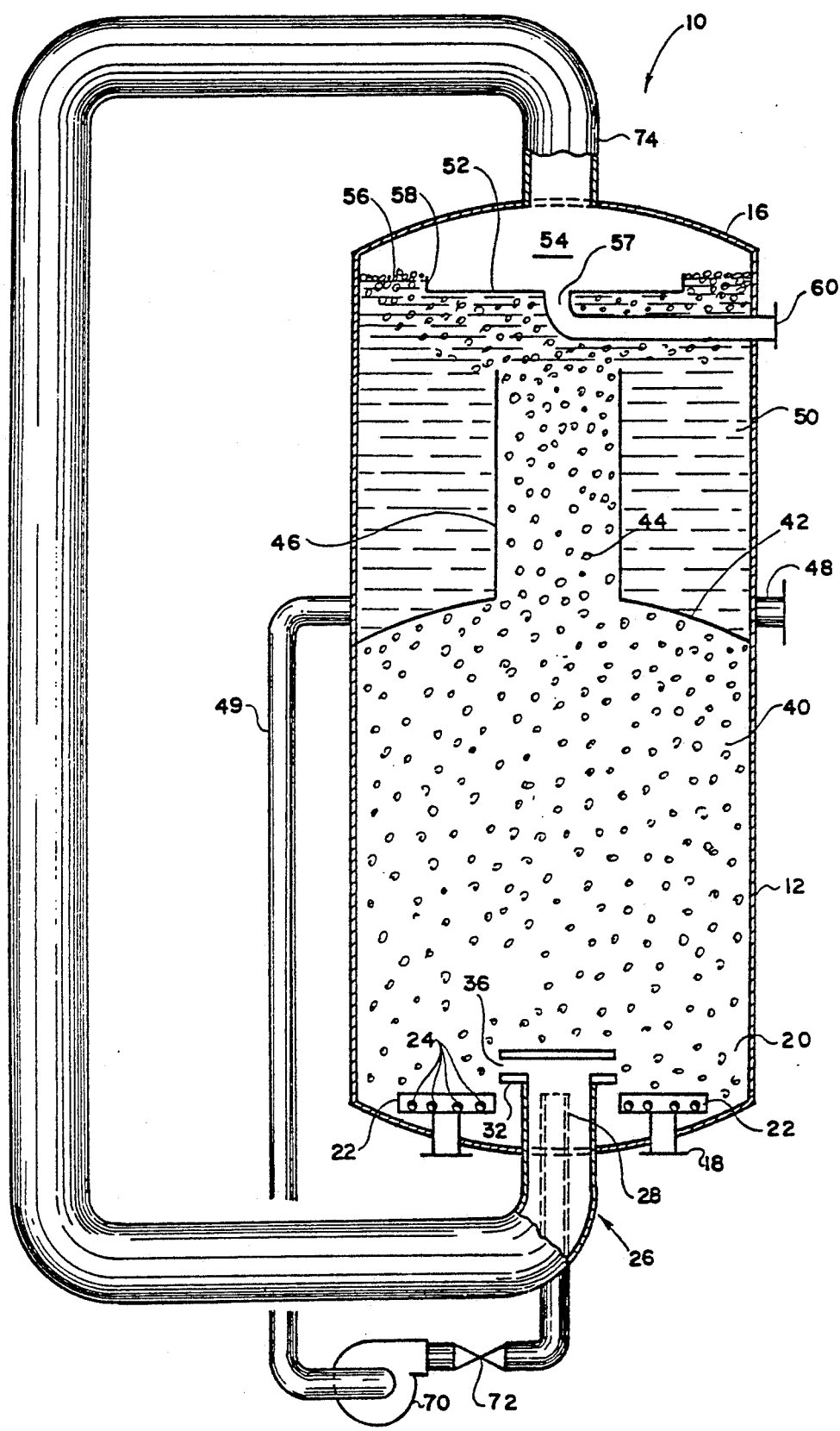
FIG. 1 is a schematic view of the preferred embodiment of the apparatus of the present invention.

The present invention will now be described, by way of example, and not limitation, with the inflow being water contaminated with oil and other suspended particles. It is to be understood that the present invention has utility in numerous applications in which it is desirable to separate suspended matter and/or oil from a liquid, and that the suspended matter, the liquid, or both may be a desired product of the process.

The preferred embodiment of the apparatus of the present invention comprises a substantially cylindrical, vertically oriented vessel 10 having a continuous cylindrical sidewall 12, bottom 14 and dome top 16. Extending through the bottom 14 is one or more liquid inlet distribution lines 18, extending through the bottom 14 into an interior chamber 20 formed by the sidewall 12, bottom 14 and dome top 16. The line(s) 18 is topped by a distribution header 22 which extends perpendicularly to a conduit formed by the line 18 and has a plurality of openings 24 therein, allowing introduction of untreated, solids laden with oil, water into the chamber 20.

A gas inlet means 26 in the form of an eductor which extends through the bottom 14 into the chamber 20 introduces gas into the chamber 20.

An annular shoulder flange 32 extends perpendicularly to a vertical axis of the gas inlet conduit 30.

A striker plate 34 is mounted a distance above the shoulder 32 in substantially parallel relationship to the shoulder 32 and perpendicularly to the vertical axis of the conduit 30. A gas outlet slot 36 is formed between the striker plate and the shoulder 32, allowing escape of the injected gas into the chamber 20. The slot 36 is positioned at a vertical level slightly above the level of liquid inlet openings 24.

As can be seen, the gas introduced through the gas conduit 30 is forced to exit at a 90 degree angle into the chamber 20. The high energy of impact and the perpendicular change of direction causes the gas to form microscopic bubbles as the gas exits through the slot 36. Immediately, upon exiting into the chamber 20, the gas mixes with the water at the bottom level of the vessel 10, such that the contaminants and all particles coat the gas bubbles and are carried upwardly towards the top of the gasification chamber 40 which forms a part of the interior chamber 20.

The gasification chamber 40 is separated from the remainder of the vessel by an annular separation concave plate 42, which is attached about its circumferential edge to the side wall 12. An opening 44 is centrally formed in the separation plate 42 and a gas conduit 46 extends in circumferential relationship to the opening 44, allowing the froth to move upwardly, in a more concentrated state towards the top of the vessel 10. The liquid and froth is forced through the gas conduit 46 by the pressure in chamber 40. Due to the differences in the specific gravity of the fluid and froth, the froth, having the lighter specific gravity, flows up to the annular space 56 and is collected in chamber 54. The liquid with the heavier specific gravity flows to the bottom of degasification chamber 50 for discharge through outlet 48.

A skim funnel 52 is mounted in the top portion of the degasification chamber 50, separating the degasification chamber 50 from the uppermost gas chamber 54. The skim funnel 52 is smaller in diameter than the diameter of the vessel side wall 12, leaving an annular space 56 between the side wall 12 and an upwardly extending rim 58 of the skim funnel 52. The skim funnel 52 is provided with a central opening 57 from which skim outlet 60 extends first vertically downward and then turning horizontally at 90 degrees to exit the vessel 10.

A portion of treated degassed water which settled on the bottom of chamber 50 leaves the vessel 10 through water recirculation line 49 to enter the vessel 10 again through the suction of an eductor pump 70 and through the gas/water eductor valve 72 to eductor 26, and more specifically to liquid inlet nozzle 28, wherein it is mixed with gas and introduced again into the gasification chamber 40 of the vessel 10.

Valve 72 is designed to adjust water flow into the vessel 10, which in turn regulates gas recirculation flow.

In the top of the vessel 10, a gas chamber 54 is formed in fluid communication with a gas recirculation line 74 which connects the top of the vessel 10 with an eductor or gas inlet means 26, recirculating the gas which was released from the bubbles carried to the upper portion of chamber 50. The gas recirculated through the line 74 is mixed with water of the line 49 which is supplied through the line 74 into the recirculated liquid nozzle 28 and, mixing with gas, is reintroduced into the vessel 10 through the slot 36.

In operation, the contaminated and/or solid laden oily water is reintroduced into the vessel 10 by inlet lines 18 and through the openings 24. The gas is introduced through the eductor or gas inlet means 26 and, mixed with water supplied through the nozzle 28 exits the inlet means through the slot 36, initiating the gasification process in the gasification chamber 40, while the solids and oily particles adhere to gas bubbles and are carried upward towards the top of the chamber 40, wherein the froth is concentrated by forcing the froth through the conduit 44 having a substantially reduced diameter in comparison with the diameter of the vessel 10. The concentrated froth exists the gasification chamber 40 and is carried further upwardly to the top of the degasification chamber 50. The froth concentrates in the annulus 56 formed between the wall 12 and the flange 58 of the concentric funnel 52. The water, having a specific gravity higher than the froth, settles by gravity in the bottom of the chamber 50 and is withdrawn therefrom through the water outlet 48 and through the water recirculation line 49. The gas released through the breaking of bubbles in the froth travels further upward into the gas collection chamber 54 and exits the vessel through recirculation line 74. The froth is removed from the funnel 52, where it flows by overflowing the top edge of the flange 58 and is withdrawn from the vessel through the opening 57 and skim outlet line 60.

In order to facilitate separation of water from gas and oily solids, adequate retention time is allowed for the fluid carried into the chamber 50, so as to utilize the difference in specific gravity between heavy water and lighter coalesced oil froth to form two distinct layers.

Figure 2:
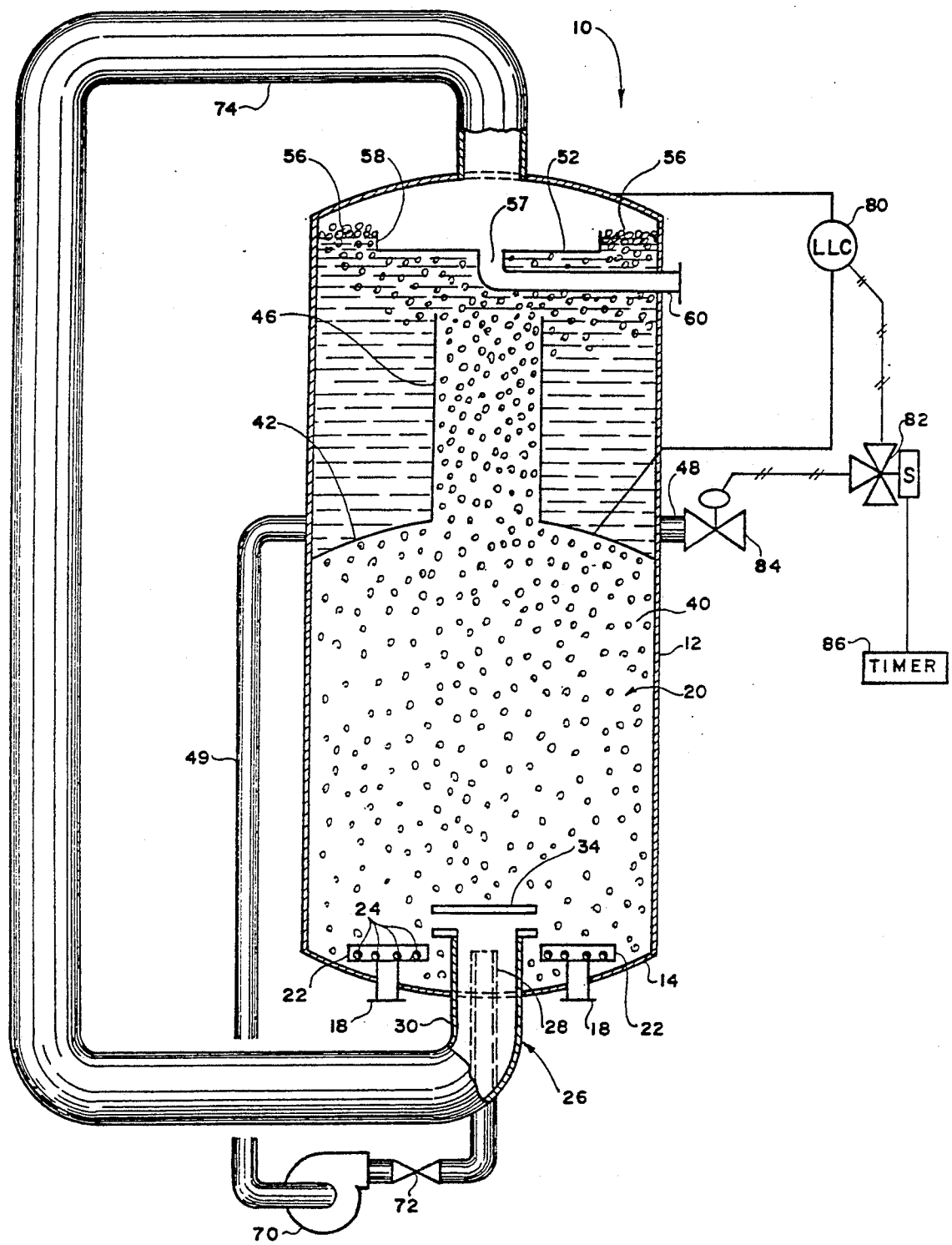
FIG. 2 illustrates one of the alternative methods of controlling skim concentration.

Reference will now be made to FIG. 2, wherein one of the alternative methods of controlling skim collection is illustrated. A liquid level controller 80 is located in the uppermost section of the vessel 10 and is adjusted to control the level of liquid within the vessel 10 slightly below the upper edge of the flange 58 of the skim collection funnel 52 by sending a control signal through a three-way solenoid valve 82 to the outlet control valve 84 which is positioned at the treated water outlet 48. An adjustable timer 86 connected to the valve 82 interrupts the control signal from the liquid level controller 80, causing control valve 84 to close or throttle to a reduced opening for a predetermined period of time of closure. This causes the level of liquid within the vessel 10 to rise and spill the oily froth and suspended solids collected at the surface over the edge of the flange 58 into the froth collection funnel 52 and exit the vessel by way of skim outlet 60.

Figure 3:
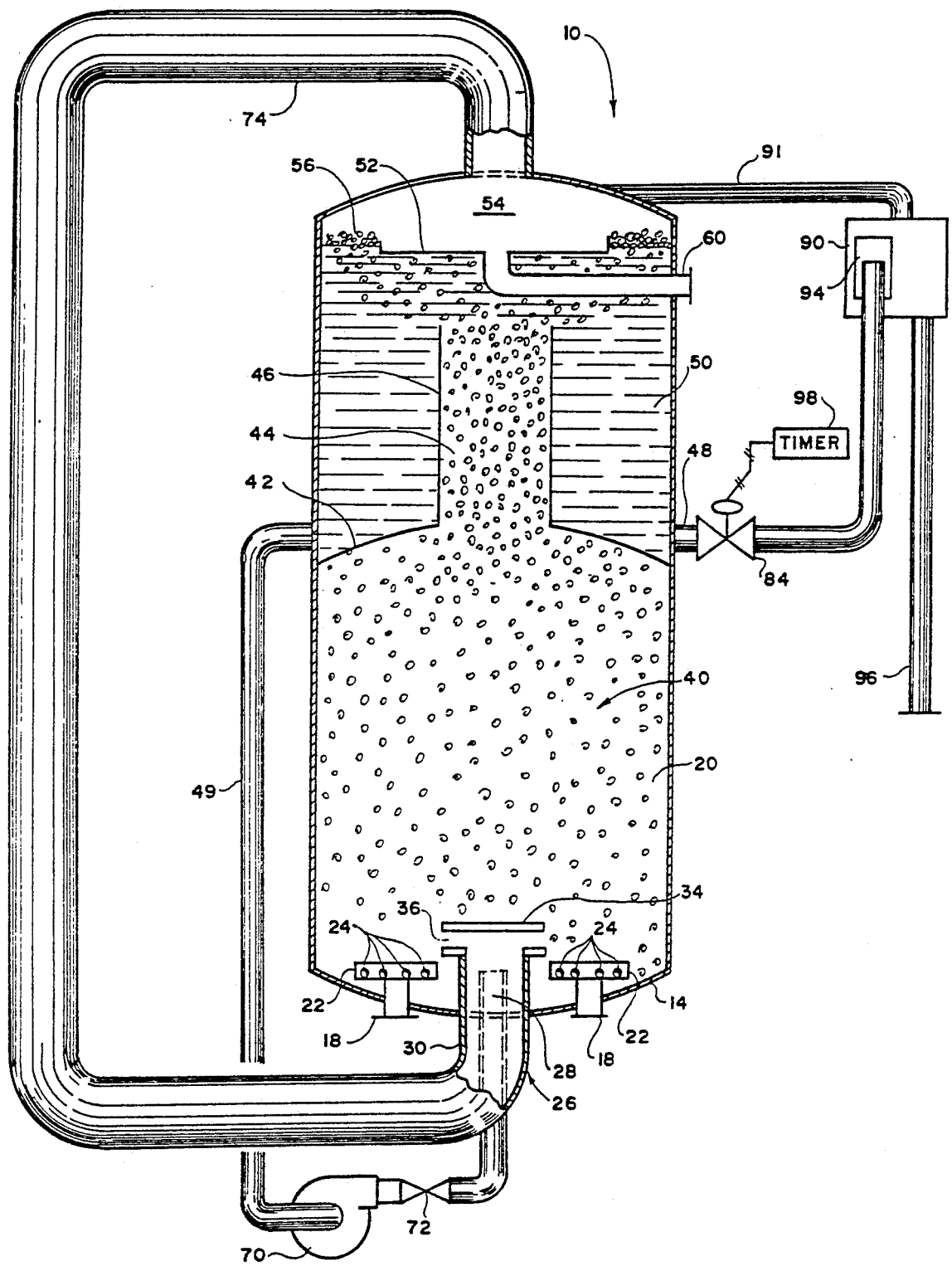
FIG. 3 is a schematic view showing another alternative method of controlling skim concentration.

Referring now to FIG. 3, a further alternative method of skim removal will be discussed. As can be seen in FIG. 3, there is provided a head chamber 90 on the uppermost portion of the vessel 10.

A vertically adjustable nozzle 92 is adjusted to control the level of liquid within the vessel 10 slightly below the upper edge of the flange 58 of the skim collection funnel 52. Treated water flows over the top edge of the vertically adjustable nozzle 92 and exits the head chamber 90 through the head chamber outlet conduit 94 and its outlet opening 96. The outlet valve 84 of the treated water outlet 48 is normally open during operation, allowing the treated water to exit the vessel 10. A preset adjustable timer 98 is operationally connected to the valve 84 through conventional means. When the timer 98 activates, the outlet valve 84 is closed or throttles, causing the liquid level to rise and spill the oily froth and suspended solids collected at the surface into the collection funnel 52 and to exit the vessel 10 through the skim outlet conduit 60.

Figure 4:
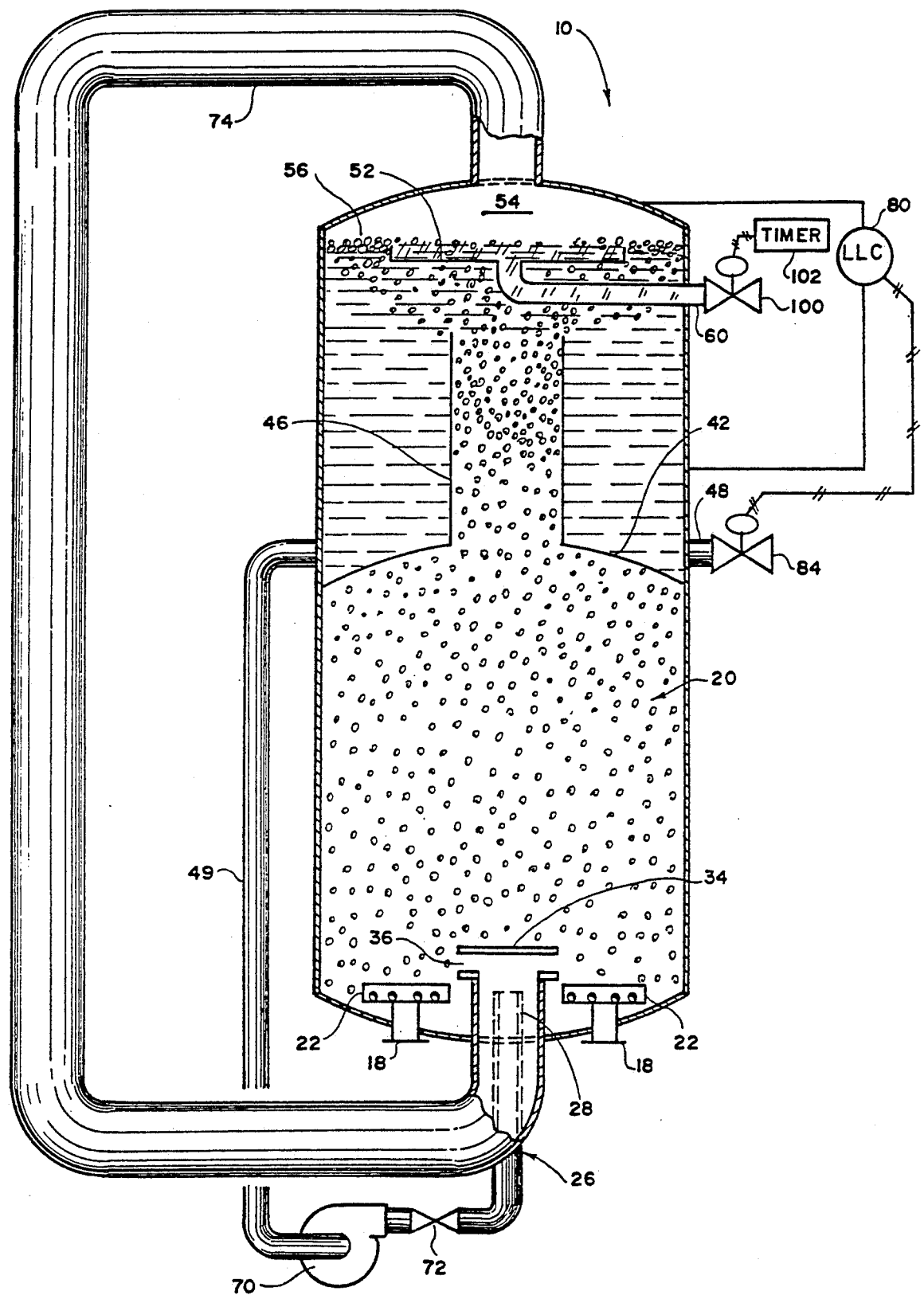
FIG. 4 is a schematic view showing still another alternative method of controlling skim concentration.

FIG. 4 illustrates still another alternative method to control skim collection within the vessel 10. A liquid level controller 80 which is similar to the liquid level controller of FIG. 2 is positioned in the uppermost section of vessel 10 and is adjusted to maintain the liquid level slightly above the upper edge of the skim collection funnel 52. It is accomplished by sending a control signal to the normally closed outlet control valve 84. The outlet control valve 84 is connected by conventional signal transmitting means to the liquid level controller 80. The skim collection outlet 60 is provided with a skim control valve 100. The valve 100 is operationally connected to a timer 102 which is adjusted to send pulses at predetermined periods of time to the valve 100.

When it is necessary to discharge the collected oily froth and suspended solids which have been pushed upwardly to the quiescent zone above the skim funnel 52, the adjustable timer 102 pulses the skim outlet valve 100, causing it to open for an adjustable period and duration of time, thus allowing skimming without interruption of the outlet flow through the valve 84.

Figure 5:
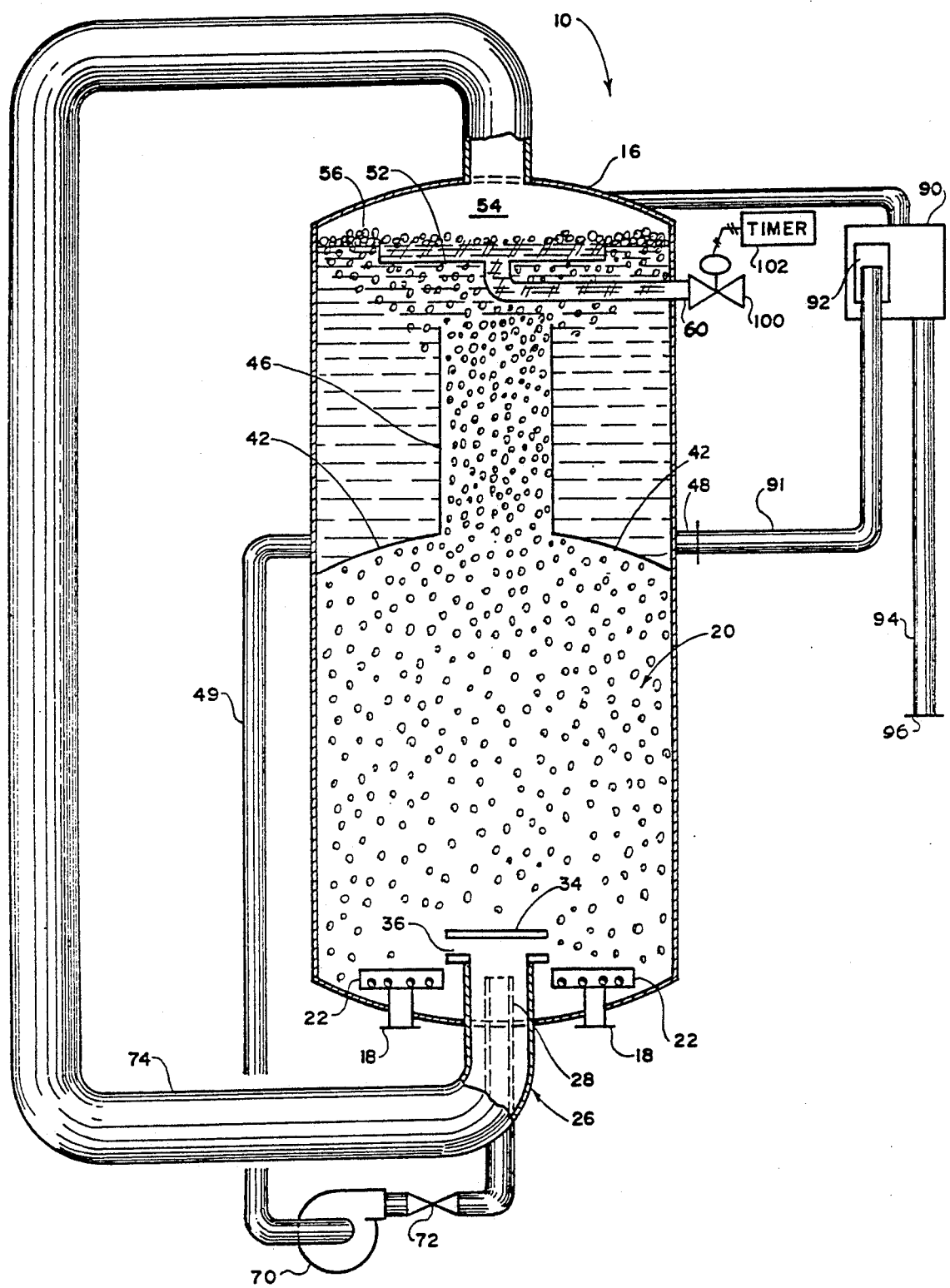
FIG. 5 is a schematic view illustrating still further alternative method of controlling skim concentration.

Referring now to FIG. 5, a still further alternative method of skimming the froth is illustrated. In the embodiment of FIG. 5, some features of the embodiments of FIG. 3 and FIGS. 4 are utilized. Such, a timer 102 is operationally connected to the skim outlet valve 100. A head chamber 90 is located on the uppermost section of the vessel 10. The head chamber 90 is fluidly connected to the uppermost portion of the vessel 10 through a conduit 91. A vertically adjustable nozzle 92 has its outlet within the head chamber 90, and an outlet line 94 has its inlet within the head chamber 90, with the outlet of the line 94 being designated by numeral 96. The vertically adjustable nozzle 92 is adjusted to maintain liquid level in vessel 10 slightly above the upper edge of the skim collection funnel 52. Treated water enters through the outlet 48 and flows through the conduit 91 into the head chamber 90 through the nozzle 92. The treated water subsequently exits the head chamber 90 through the outlet line 94 and ultimate outlet 96.

Meanwhile, oily froth and suspended solids are forced upward to the quiescent area above skim funnel 52. This collection of oily froth and suspended solids is discharged from the vessel 10 through skim outlet line 60 and normally closed skim valve 100. The adjustable timer 102 pulses the skim valve 100 open for an adjustable interval, thus permitting skimming without interrupting outlet flow of treated water through the outlet conduit 91, into the head chamber 90 and into the ultimate treated liquid outlet 96.

The volume of skim collection is therefore controlled by controlling the flow of treated liquid from the vessel. Normally, as illustrated in FIG. 5, the volume of fluid in the vessel is adjusted to retain the level of fluid slightly above the edge of the skim collection funnel 52.

Figure 6:
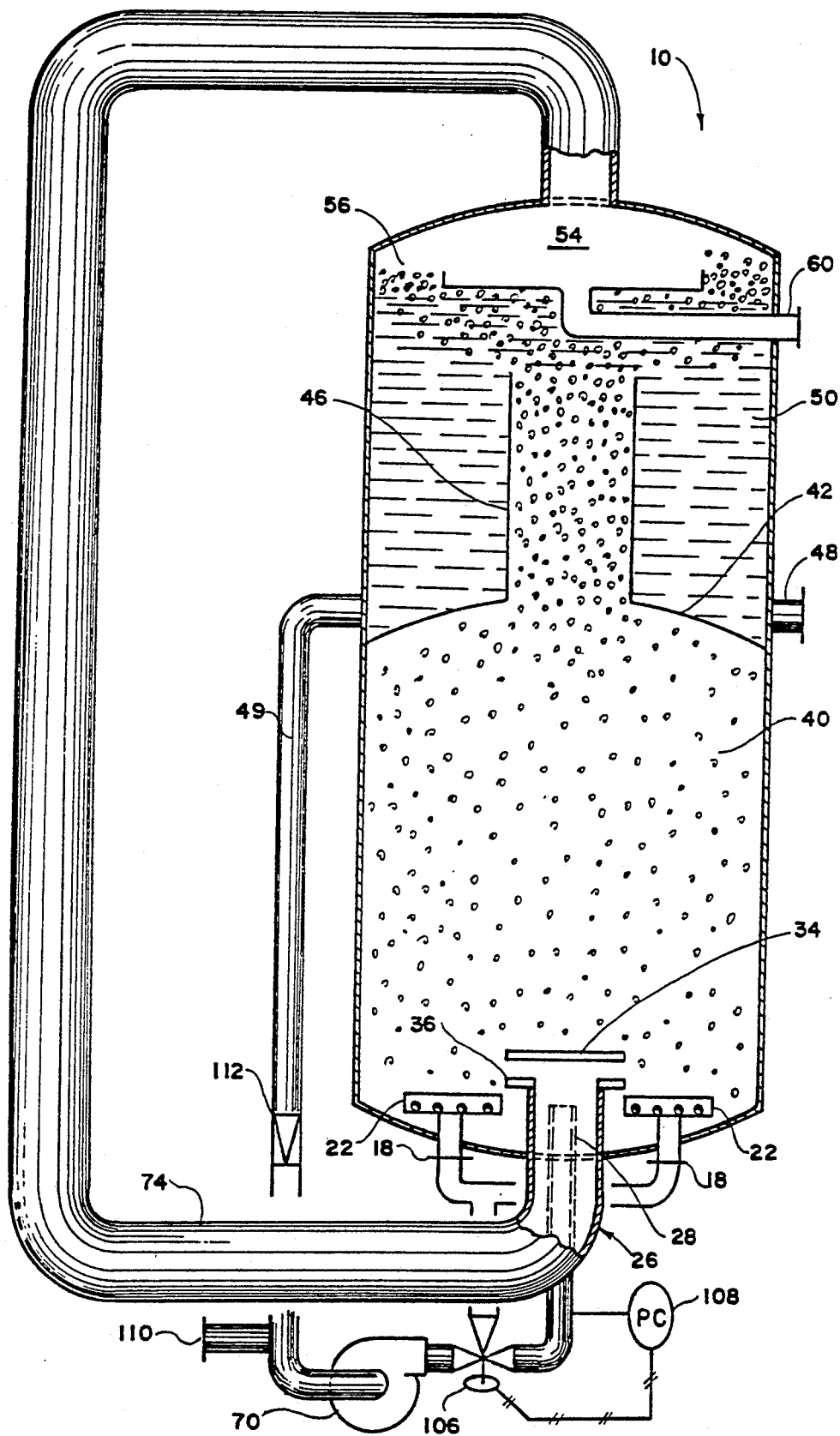
FIG. 6 is a schematic view of the preferred embodiment of the present invention showing an alternative influent method.

Referring now to FIG. 6, the apparatus of the present invention is illustrated as having alternate means for introducing contaminated fluid into the vessel 10. The water to be treated, which contains oil particles and suspended solids enters line 110 and flows through the eductor pump 70 and three-way pressure control valve 106 into the nozzle 28 (which forms a part of the secondary liquid distribution means). A pressure controller 108 adjusts the three-way valve 106 (or any other suitable means of bypassing) to maintain proper pressure on the nozzle 28. Any excess water is diverted by the three-way valve 106 to the primary contaminated liquid inlet line 18 which is located on the bottom of the vessel 10 and from then onto the distribution header(s) 22 which are located adjacent to and below the eductor assembly or gas inlet means 26. When the head pressure in water circulation line 49 is greater than the supply pressure in the inlet line 110, a check valve 112, positioned in the water circulation line 49, opens to provide supplemental eductor water to the suction of eductor pump 70. The check valve 112 is positioned between the inlet of the line 49 from the chamber 50 and the pump 70. When the pressure at inlet connection 110 is greater than the head pressure in water circulation line 49, the normally opened check valve 112 closes to prevent influent water from contaminating the water in degasification chamber 50. In this manner, more effective intimate mixing of influent oily water and suspended solids is achieved. An added advantage of this alternate method is that the water volume which is removed from the degasification chamber 50 is reduced or completely eliminated, thus increasing the retention time of water in degasification chamber 50 and improving efficiency of the vessel by increasing the retention time. This alternate inlet arrangement can be used with any of the skim collection methods which have been illustrated and discussed above.

From the foregoing description, it will be appreciated that an improved apparatus and method of separating water from contaminants is disclosed. The single gas eductor mechanism requires no complex balancing, as the case would have been with multiple cells. A single skimmer arrangement also allows to avoid balancing of individual levels within various multiple cells. The skim volumes of less than one percent (1%) to three percent (3%) can be easily achieved utilizing the apparatus and method of the present invention. The concentration of oil and solids in skimmed froth which reaches the skim collection funnel is greater, thus allowing to substantially reduce the volume of waste which has to be handled by the users. The vertical cylindrical shape of the vessel permits better gas distribution and improved efficiency in comparison with other geometric configurations. Additionally, an improved method of achieving intimate mixing of gas and water is disclosed herein.

While a number of embodiments of the present invention have been described herein, it is to be understood that various modifications can be made thereto without departing from the spirit and scope of the present invention. I therefore, pray that my rights to the present invention be limited only by the following claims.

I claim:

1. An apparatus for removing suspended matter from a liquid, comprising:

a substantially cylindrical vertically oriented vessel having a convex down bottom a concave down closed top and a continuous side wall forming an interior chamber adapted to receive a flow of liquid having suspended matter therein; said vessel having a vertical axis;

an annular separation wall means having an opening therein and being mounted in the vessel transversely to the vertical axis of the vessel for separating a lower gasification chamber from the remainder of the interior chamber;

a degasification chamber formed above said separation wall means in fluid communication with the gasification chamber through the opening;

means for introducing the flow of liquid into the gasification chamber;

means for introducing a flow of gas into the gasification chamber for attracting the suspended matter and for carrying the suspended matter upwardly to an upper portion of the vessel;

means for concentrating the suspended matter extending vertically through at least a portion of the degasification chamber;

a skim collection means for collecting the suspended matter in the upper portion of the vessel and delivering the skim outside the vessel, said skim collection means being positioned at a level above said suspended matter concentrating means;

means for removing treated liquid from the vessel positioned in a lower part of the degasification chamber;

treated water recirculation means fluidly connecting the degasification chamber with said liquid flow introducing means for facilitating introduction of the gas flow from said means for introducing said flow of gas into the gasification chamber; and a means for controlling a volume of skim collection by changing a volume of liquid in the vessel at predetermined intervals.

2. The apparatus of claim 1, wherein said means for controlling skim collection volume comprise a liquid level controller means operatively connected with the upper portion of the vessel and having means for transmitting a signal to a control valve means, said control valve means being operatively connected to the means for removing treated liquid from the vessel, and an adjustable timer means connected to the valve means for intermittently interrupting said signal from said liquid level controller means to slightly increase said volume of liquid contained within the vessel by throttling or closing said control valve means, so as to raise a level of liquid and allowing skimming through said skim collection means.

3. The apparatus of claim 1, wherein said means for controlling skim collection volume comprise a normally open treated liquid outlet valve means, an adjustable timer means operatively connected to said valve means and said timer means having means to send an intermittent signal to said valve means causing said valve means to close, and a vertically adjustable nozzle means connected to said treated liquid outlet means and said nozzle means acts to maintain a predetermined volume of liquid in the vessel.

4. The apparatus of claim 1, wherein said means for controlling skim, collection volume comprises a liquid level controller means operatively connected with the upper portion of the vessel and having means for transmitting a signal, a treated liquid outlet control valve means operatively connected to receive said signal from said liquid level controller means, an adjustable timer means having means to send an intermittant signal and a normally closed skim collection outlet valve means which is operatively connected to said timer means to recieve said intermittant signal and opens in response to said intermittent signal received from said timer.

5. The apparatus of claim 1, wherein said means for introducing the liquid comprise at least one conduit connected 6. An apparatus for removing suspended matter from a liquid, comprising;
 a substantially cylindrical vertically oriented vessel having an interior chamber therein adapted to receive a flow of liquid having suspended matter therein;
 an annular separation wall means mounted in the vessel transversely to a vertical axis of the vessel for separating a lower gasification chamber from the remainder of the interior chamber, said separation wall means having a central opening therein and being attached to a continuous side wall of the vessel about the circumference thereof;
 a degassification chamber formed above said separation wall means in fluid communication with the gasification chamber through said central opening;
 means for introducing the flow of liquid into the gasification chamber comprising a primary liquid distribution means located adjacent a bottom of the vessel and a secondary liquid distribution means having an independent outlet within the vessel at a level slightly above said primary liquid distribution means;
 means for introducing a flow of gas in the gasification chamber for attracting the suspended matter and for carrying the suspended matter upwardly to the degassification chamber, said gas introducing means comprising an eductor means having an outlet at substantially same level as an outlet of said secondary liquid distribution means within the vessel;
 means for concentrating the suspended matter extending vertically through at least a portion of the degassification chamber, said means for concentrating comprising a vertical funnel having a diameter substantially smaller than diameter of the interior chamber, said funnel being attached to said separation wall means and circumferentially surrounding said opening in the separation wall means;
 a skim collection means for collecting the suspended matter in the upper portion of the vessel and delivering skim outside of the vessel, said skim collection means being positioned at a level above said concentration means;
 means for removing treated liquid from the vessel positioned in a lower part of the degasification chamber; and,
 a means for controlling a volume of skim collection comprising a liquid level controller means operatively connected to the upper portion of the vessel, said liquid level control means having means to transmits a signal to a normally open control valve means, said control valve means operatively connected to the means for removing treated liquid from the vessel and an adjustable timer means operatively connected to said control valve means for intermittently interrupting said signal from said liquid level controller means to slightly increase said volume of liquid contained within the vessel by throttling or closing said control valve means, so as to raise a level of liquid and allow skimming through said skim collection means.

7. The apparatus of claim 6, further comprising a treated water recirculation means fluidly connecting the degasification chamber with said means for introducing liquid into the vessel.

8. The apparatus of claim 7, wherein said liquid recirculation means is provided with a check valve means mounted upstream from a point of connection of said liquid recirculation means to said liquid introducing means, said check valve means opening when a value of pressure in said recirculation line is greater than a value of pressure in said liquid introducing means.

9. The apparatus of claim 6, further comprising a gas recirculation means fluidly connecting the upper portion of the degasification chamber with said means for introducing the flow of gas into the gasification chamber.

10. The apparatus of claim 6, wherein said means for introducing liquid comprise a means of bypassing fluidly connected to said primary and said secondary liquid distribution means and mounted upstream from said outlet of said secondary liquid distribution means.

11. The apparatus of claim 6, wherein said secondary liquid distribution means comprise a pressure control means operatively connected with said means for bypassing and said pressure control means functions to control a predetermined flow of liquid through said secondary liquid distribution outlet means and divert any excess liquid through said primary liquid distribution means.

12. An apparatus for removing suspended matter from a liquid, comprising;
 a substantially cylindrical vertically oriented vessel having an interior chamber therein adapted to receive a flow of liquid having suspended matter therein;
 an annular separation wall means mounted in the vessel transversely to a vertical axis of the vessel for separating a lower gasification chamber from the remainder of the interior chamber, said separation wall means having a central opening therein and being attached to a continuous side wall of the vessel about the circumference thereof;
 a degassification chamber formed above said separation wall means in fluid communication with the gasification chamber through said central opening;

means for introducing the flow of liquid into the gasification chamber comprising a primary liquid distribution means located adjacent a bottom of the vessel and a secondary liquid distribution means having an independent outlet within the vessel at a level slightly above said primary liquid distribution means;

means for introducing a flow of gas in the gasification chamber for attracting the suspended matter and for carrying the suspended matter upwardly to the degasification chamber, said gas introducing means comprising an eductor means having an outlet at substantially same level as an outlet of said secondary liquid distribution means within the vessel;

means for concentrating the suspended matter extending vertically through at least a portion of the degassification chamber, said means for concentrating comprising a vertical funnel having a diameter substantially smaller than diameter of the interior chamber, said funnel being attached to said separation wall means and circumferentially surrounding said opening in the separation wall means;

a skim collection means for collecting the suspended matter in the upper portion of the vessel and delivering skim outside of the vessel, said skim collection means being positioned at a level above said concentration means;

means for removing treated liquid from the vessel positioned in a lower part of the degassification chamber; and, a means for controlling a volume of skim collection comprise a liquid level controller operatively connected with the upper portion of the vessel and having means to transmit a signal, treated liquid outlet control valve means operatively connected to receive said signal from said liquid level controller, an adjustable timer means, connected to a normally closed skim collection outlet means and having means to transmit an intermittent signal to said normally closed skim collection outlet means which opens in response to said intermittent signal received from said timer means.

13. An apparatus for removing suspended matter from a liquid, comprising:

a substantially cylindrical vertically oriented vessel having an interior chamber therein adapted to receive a flow of liquid having suspended matter therein;

an annular separation wall means mounted in the vessel transversely to a vertical axis of the vessel for separating a lower gasification chamber from the remainder of the interior chamber, said separation wall means having a central opening therein and being attached to a continuous side wall of the vessel about the circumference thereof;

a degassification chamber formed above said separation wall means in fluid communication with the gasification chamber through said central opening;

means for introducing the flow of liquid into the gasification chamber comprising a primary liquid distribution means located adjacent a bottom of the vessel and a secondary liquid distribution means having an independent outlet within the vessel at a level slightly above said primary liquid distribution means;

means for introducing a flow of gas in the gasification chamber for attracting the suspended matter and for carrying the suspended matter upwardly to the degasification chamber, said gas introducing means comprising an eductor means having an outlet at substantially same level as an outlet of said secondary liquid distribution means within the vessel;

means for concentrating the suspended matter extending vertically through at least a portion of the degassification chamber, said means for concentrating comprising a vertical funnel having a diameter substantially smaller than diameter of the interior chamber, said funnel being attached to said separation wall means and circumferentially surrounding said opening in the separation wall means;

a skim collection means for collecting the suspended matter in the upper portion of the vessel and delivering skim outside of the vessel said skim collection means being positioned at a level above said concentration means;

means for removing treated liquid from the vessel positioned in a lower part of the degassification chamber; and, a means for controlling a volume of skim collection comprising a normally open treated liquid outlet valve means operatively connected to said treated liquid removing means, an adjustable timer means operatively connected to said valve means and having means to send intermittent signals to said valve means causing said valve means to close, and a normally open, vertically adjustable nozzle means connected to said treated liquid outlet means and, for maintaining a predetermined volume of liquid in the vessel.

* * * * *